No. 677,250. Patented June 25, 1901.
F. W. MILLER.
AGRICULTURAL IMPLEMENT.
(Application filed Nov. 21, 1900.)
(No Model.) 3 Sheets—Sheet 1.
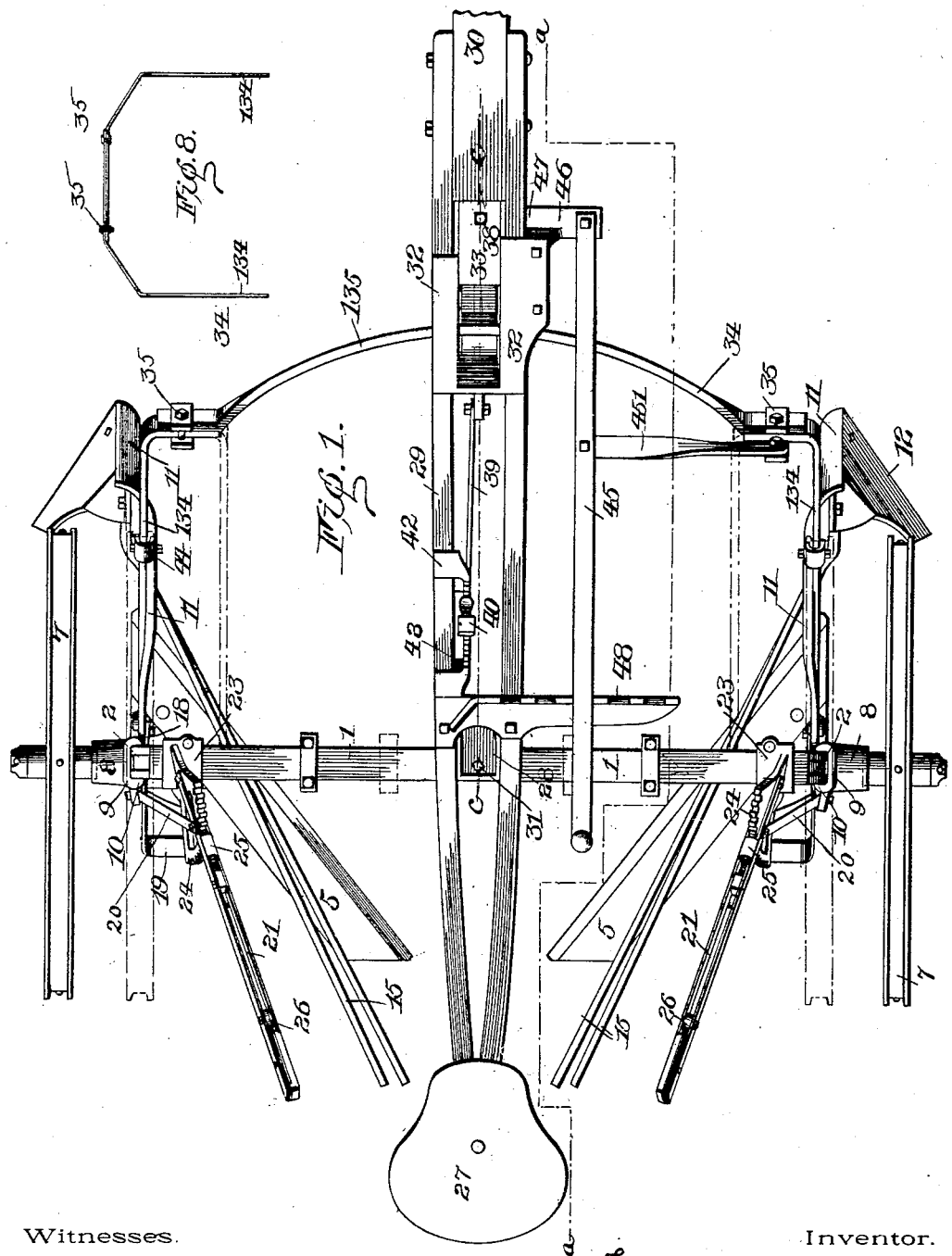

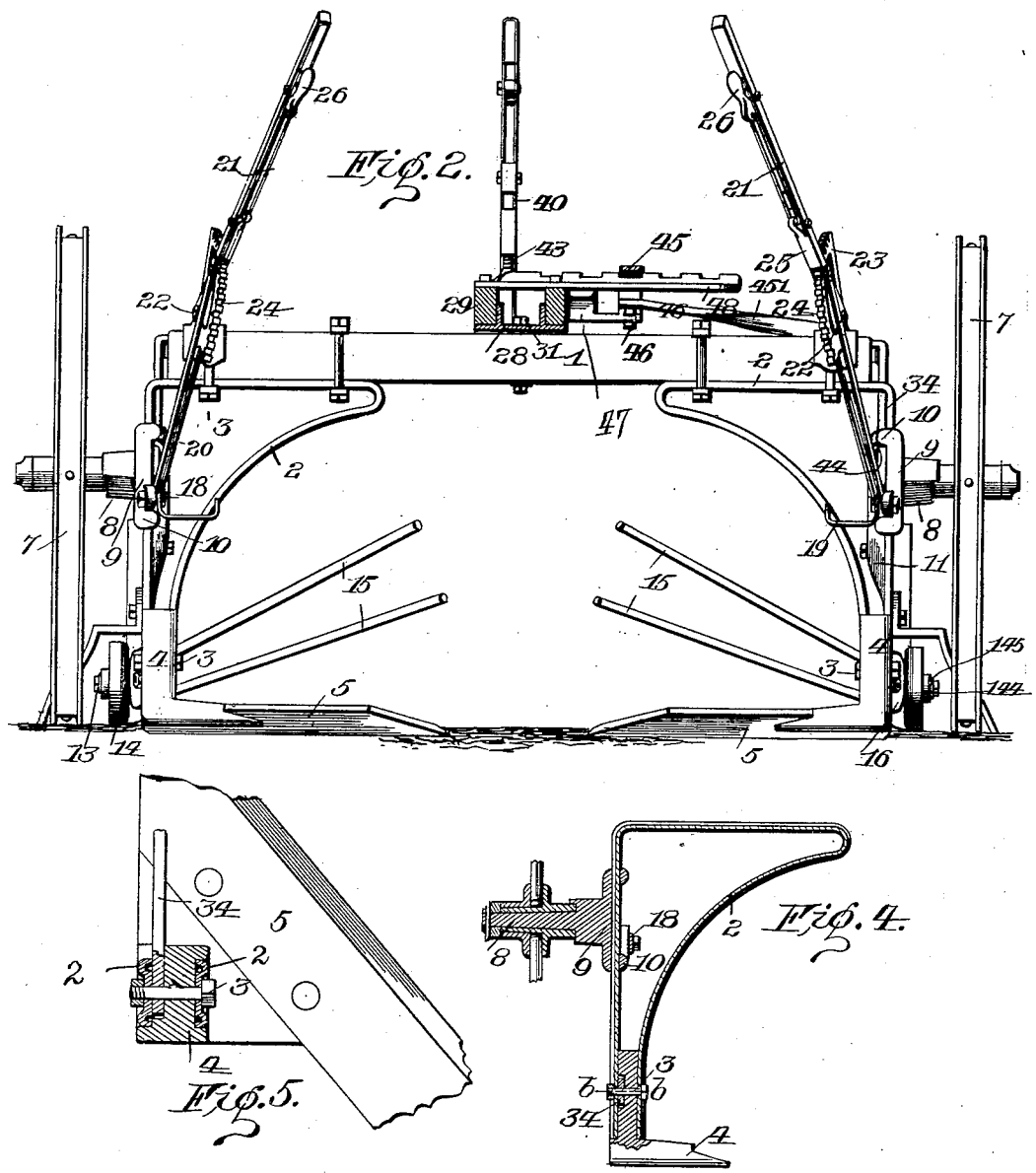

No. 677,250. Patented June 25, 1901.
F. W. MILLER.
AGRICULTURAL IMPLEMENT.
(Application filed Nov. 21, 1900.)
(No Model.) 3 Sheets—Sheet 3.
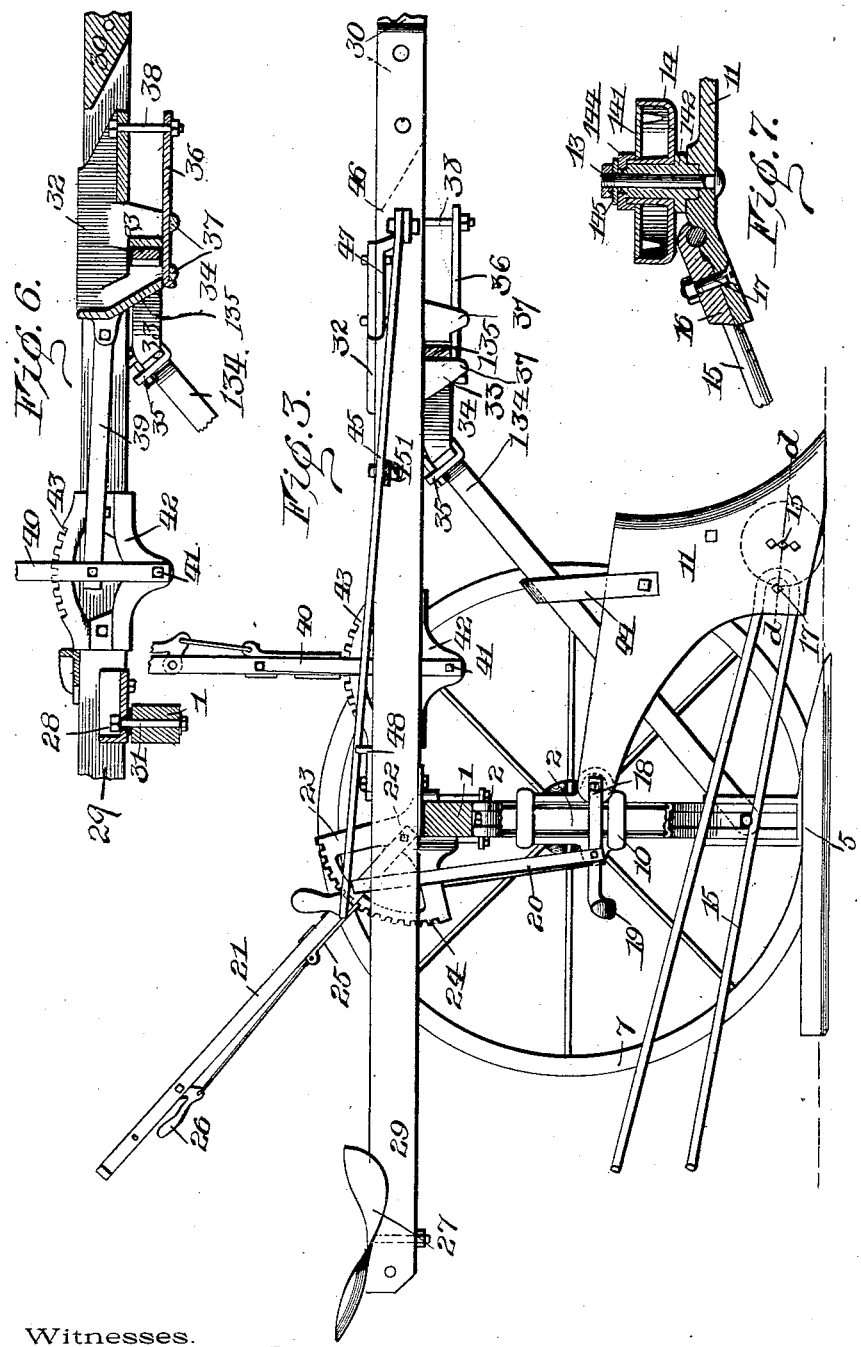
Witnesses. Inventor.

UNITED STATES PATENT OFFICE.

FREDRICK W. MILLER, OF CALEDONIA, NEW YORK.

AGRICULTURAL IMPLEMENT.

SPECIFICATION forming part of Letters Patent No. 677,250, dated June 25, 1901.

Application filed November 21, 1900. Serial No. 37,192. (No model.)

*To all whom it may concern:*

Be it known that I, FREDRICK W. MILLER, of Caledonia, in the county of Livingston and State of New York, have invented certain new and useful Improvements in Agricultural Implements; and I hereby declare the following to be a full, clear, and exact description of the same, reference being had to the drawings forming a part of this specification and to the numerals marked thereon.

My present invention relates to agricultural implements having supporting-wheels and tools or shares operating in or upon the ground and particularly adapted to machines for harvesting beans, and has for its object to improve the construction and operation whereby the various adjustments of the parts may be readily accomplished by the operator and the part operating upon or in the ground—such, for instance, as the share or cutting device of a bean-harvester—can be raised, lowered, and tilted, as desired, and various other adjustments may be accomplished, so that the machine is readily adapted for operating on side-hills or crooked rows and may be turned around in a comparatively small space.

It further consists in certain improvements in construction and combination of parts, some of which are applicable to other agricultural implements, whereby the machine may be readily adjusted, repaired, and assembled, all as will be hereinafter fully described and the novel features pointed out in the claims at the end of this specification.

In the accompanying drawings, Figure 1 is a plan view of a bean-harvesting machine constructed in accordance with my invention; Fig. 2, a rear elevation of the same, the seat-support being shown in section; Fig. 3, a sectional view on the line $a\ a$ of Fig. 1; Fig. 4, a vertical sectional view through the wheel-axis; Fig. 5, a horizontal sectional view on the line $b\ b$ of Fig. 4; Fig. 6, a longitudinal sectional view on the line $c\ c$ of Fig. 1; Fig. 7, a horizontal sectional view on the line $d\ d$ of Fig. 3; Fig. 8, a view of a modification.

Similar reference-numerals in the several figures indicate similar parts.

In carrying out my invention I have shown it embodied in a bean-harvester, to which class of machines it is especially adapted, though capable of use on celery-covering machines, cultivators, or other devices which employ shares or equivalent ground-operating parts.

The main frame of the machine consists of a cross-bar or axle 1, having bolted or clipped to the under side of the ends triangular frames or standards 2, which are preferably composed of a single strip of cast or wrought metal with the lower ends of the vertically-extending portions brought together and secured rigidly by bolts 3 to the upwardly-extending portion 4 of the blade, share, or implement operating in the ground, such as the shares or knives 5 of the bean-harvester, the latter being located on opposite sides of the central or draft line of the machine, and having their cutting edges inclined toward the rear, as shown in Fig. 1. The upper horizontal portions of the frames or standards 2 are preferably secured to the frame or axle 1 by clips embracing the parts, as shown, so that they may be readily attached or detached for the purposes of adjustment longitudinally of the axle or for repair.

7 indicates the supporting-wheels, mounted upon stud-axles 8, secured to or forming parts of brackets 9, sliding upon the vertical portions of the standards 2 and having the loops 10 extending around the vertical or outer portions of the standards, whereby the wheels and frame may be separately adjusted relatively vertically to change the height of the shears relative to the surface of the ground. Pivotally connected to the front portions of the brackets 9 are the dividers or vine-lifters embodying shoes 11, having the outwardly-extending shares or flaring portions 12 extending in front of the supporting-wheels of the machine, as shown in Fig. 1, and arranged within the dividers and pivoted loosely upon bolts or studs 13 are the divider-supporting wheels 14, constructed, preferably, as shown in Fig. 7, of a dished wheel and a cover-plate 141 thereon loosely journaled upon a boss 142, fastened by the bolt 13, a recessed washer 144 and a plain washer and a nut 145 holding the parts in place.

15 indicates the gathering-rods of the bean-harvester, secured to the inner sides of the dividers and extending rearwardly over the shares and converging toward the center of the machine, as shown in Fig. 1, so as to guide the vines along and over the rear of the shares and lay them in windrows. Two of these rods are provided for each of the lifters, and they are each preferably composed of a single metal rod bent at the center and confined by a clip-plate 16, serving to hold the bent central portion of the rod in a groove formed inside of the clip-plate and in the inner side of the divider-shoe, said clip-plate being secured in position by the bolt 17, all as shown in Fig. 7. This construction simplifies the parts and enables the gathering-rods to be readily applied and removed when desired. The rear portion of the divider-shoe is held in position and permitted to turn freely upon a boss formed on the bracket 9 by means of a plate 18, which extends rearwardly and is formed into a stirrup 19, forming a support for the driver's feet, although the dividers are permitted to move on the pivots, being supported on the wheels. Connected to the rear of each of the brackets 9 are lifting-links 20, pivoted at their upper ends to hand-levers 21, pivoted at 22 to brackets 23, secured to the opposite ends of the axle or main frame 1, said brackets being also provided with adjusting-segments 24, with which coöperate the dogs or bolts 25, arranged upon the levers and adapted to be operated by means of the gripping-handles 26, whereby the operator may readily lift either end of the frame relative to the supporting-wheels and the brackets 9 when desired. The centrally-extending beam 29 of the machine, carrying at its rear end the driver's seat 27, is preferably formed of two separate pieces extending over the axle or frame 1 and on opposite sides of a casting or bracket 28, thence forwardly, and bolted at their forward ends upon opposite sides of the tongue or pole 30.

31 indicates a pivot or bolt extending through the plate 28 and also through the center of the axle or frame 1, so that the beam and frame may be swung relatively, both laterally and vertically, thus varying the line of draft and the pitch or angle of the shares or other device operating in or upon the ground, as will be described.

32 indicates a bracket or frame sliding between the side pieces 29 of the beam and having at its upper edges flanges resting upon the latter and upon its lower side and preferably centrally beneath the beam the flanges or projections 33, between which passes the central portion of a bail or yoke frame 34, extending rearwardly and outwardly and pivotally connected at its ends to the lower ends of the standards or frames 2 on the axle, the ends of the yoke or bail preferably extending between the extension 4 of the shear and the inner side of the vertical arm of the standard and permitted a slight pivotal movement, as shown particularly in Fig. 4. This bail or yoke 34 is preferably composed of the two side bars 134 and the central bar or crosspiece 135, adjustably connected at their ends, preferably by having their ends lapped and secured by clips 35, as shown in Figs. 1 and 3, for the purpose of enabling the yoke to be adjusted wider or narrower, as will be described.

The segmental cross-bar 135 of the yoke is preferably curved on an arc struck from the bolt 31 when the bracket 32 is in practically its middle position of adjustment and its ends are extended laterally, as shown, to lap the inwardly-extending ends of the rods or side bars 134, so that by loosening the clips 35 the side bars may be moved in or out to widen or narrow the machine, the standards 2 being adjustable upon the main frame or axle. As the side bars 134 are removable from the bar 135 and the standards, they could be removed and interchanged, so that the forward ends were turned outwardly, if desired, thereby enabling the machine to be made quite narrow, as indicated by the dotted lines in Fig. 1, or instead of making the yoke in three parts the sides 134 could be extended toward the center and lapped, as shown on a smaller scale in Fig. 8.

The forward or central portion of the yoke is supported between the projections 33 by means of a plate 36, having a hooked rear end extending over the loop 37, formed on the bracket, the forward end of said plate being secured by a bolt 38, as shown in Fig. 6, this construction facilitating the connection and disconnection of the bail or yoke and the bracket 32. The yoke forms, with the beam and standard, a frame having considerable strength and provides a draft upon the lower ends of the standards, preventing their bending or breaking when an obstruction is encountered, and aside from the adjustment afforded this construction could be employed to advantage in other machines.

39 indicates a link pivoted at the forward end to the frame or bracket 32 and at its rear end to a lever 40, pivoted at 41 upon a bracket 42, secured upon one of the side pieces of the beam, said bracket being also provided with a notched segmental portion 43, with which a hand-operated bolt on the lever 40 engages to secure the parts in adjusted position. This lever serves as a means of moving the bracket 32, and through this the yoke 34, forward and backward upon the beam, the beam and axle 1 pivoting relatively upon the bolt 31, which passes somewhat loosely through the bracket 28, thereby permitting the angle which the shares maintain relative to the beam to be changed—that is, assuming the beam and tongue to be maintained in a horizontal position the cutting edges of the shares may be inclined upwardly or downwardly or parallel with this plane. The adjustment of the standards relative to the beam by the means described is also advantageous to adapt the machine for tall and short horses, whether or not the shares or blades are adapted for use in cutting beans and operate in a substantially horizontal plane. The upper portions of the dividers 11 are provided with loops 44, through which the lower portions of the yoke or bail pass, thus preventing the dividers from dropping too low or becoming displaced laterally by engagement with a stone or other obstacle. The laterally-swinging movement of the frame or axle 1 and the beam upon the bolt 31 is accomplished by means of a lever 45, pivoted to a link 451, that is also pivoted upon one of the clips 35, as shown in Figs. 1 and 3, the forward end of the lever being pivoted to a projection 46 on a plate 47, bolted to one of the flanges of the bracket or frame 32. The rear end of the lever 45 is movable vertically by reason of its elasticity, being of metal, and is adapted to be engaged with the notches in a plate 48, secured to the beam, as shown in Fig. 1, to secure the parts.

From the above construction it will be seen that the operator stationed upon the seat 27 may by the manipulation of the levers 21, 40, and 45 raise or lower either side of the frame relative to the supporting-wheels or adjust the shares relative to the plane of the beam or swing the frame and beam relatively upon a horizontal axis, so as to cause the machine to operate in the best manner either in gathering beans on the hillside in various kinds of soils or when the rows are crooked, and any combination of these adjustments may be provided for without requiring him to leave his seat.

The object of forming the bail or yoke 34 in two or three parts and of securing standards 2 to the axle or frame 1 by clips, as shown, is to enable me to adjust the width of the machine as may be desired and to operate in fields having vines or plants located different distances apart or in which from the character of the soil or otherwise the location of the vines or plants varies.

A further advantage flowing from the pivotal connection of the beam and main axle or frame and the employment of the yoke having segmental forward portion is that when it is desired to turn the machine at the end of a row the pole or beam may be disconnected from the yoke and the horses turned partially around without swinging the axle or frame, thus enabling them to enter between the next rows without running the machine over a row or causing the horses to trample the vines or plants.

The machine as a whole is simple and as I have found by practical use efficient in operation, the various adjustments being quickly accomplished. While the yoke is connected to the lower end of the standards in the present arrangement, it is, in effect, connected mediately to the frame or axle and also to the ground-tools—that is, the share or shears or cutters.

I claim as my invention—

1. The combination with the main frame, the standards rigidly secured to the frame and the shares thereon, of the supporting-wheel separately adjustable relatively to the frame, the beam connected to the frame and means for adjusting and securing the shares and beam relatively in a vertical plane to change the angle of the former.

2. The combination with the axle and the supporting-wheels, the standard on the axle, the share carried thereby, the draft-beam pivoted on the axle to turn in a vertical plane and means for adjusting the beam and axle on the pivot and securing them in adjusted position.

3. The combination with the axle and the supporting-wheels, the standards on the axle, the draft-beam pivoted on the axle to turn in a vertical plane relatively thereto, and means for adjusting the beam and axle on the pivot and securing them in adjusted position.

4. The combination with the supporting-wheels, and the main frame, of the beam pivoted to the frame to tilt relatively in a vertical plane, a standard secured to the beam, a bar extending from the lower portion of the standard to the beam and means for adjusting and securing said bar relatively to the parts whereby the standard and beam may be adjusted to alter the angle of the former relatively to a horizontal plane.

5. The combination with the supporting-wheels, the main frame and the standard secured to the latter, of the beam pivoted to the frame to tilt relatively in a vertical plane, a yoke extending from the lower portion of the standard to the beam and means for adjusting and securing said yoke relatively to the parts whereby the standard and beam may be adjusted to alter the angle of the former relatively to a horizontal plane.

6. The combination with the supporting-wheels, the main frame and the standards secured to the latter, of the beam pivoted to the frame to tilt relatively in a vertical plane, a yoke extending from the standards to the beam forward of its connection with the frame and means for adjusting and securing the yoke on the beam whereby the plane of the standards relatively to the beam may be altered.

7. The combination with the supporting-wheels, the main frame, the standards thereon, the beam pivotally connected to the frame to tilt relatively thereto in a vertical plane, the yoke connected to the standards and the bracket engaging the yoke and adjustable on the beam.

8. The combination with the main frame, the supporting-wheels, the brackets on which they are mounted, adjustable relatively to the main frame, and the shares on the frame, of the beam pivotally connected to the frame to tilt relatively thereto in a vertical plane, the yoke connected to the shares and adjustably connected to the beam.

9. The combination with the main frame and the supporting-wheels, the shares on the frame, the beam pivoted to the frame on a vertical pivot and means for securing the parts when adjusted, a yoke connected to the frame and loosely connected to the beam to slide laterally thereof.

10. The combination with the main frame and the supporting-wheels, the shares on the frame, the beam pivoted to the frame to tilt vertically and laterally thereof, the yoke connected to the frame and adjustably connected to the beam to slide laterally and longitudinally thereof.

11. The combination with the main frame, the shares thereon, the supporting-wheels separately vertically adjustable relative thereto, the beam pivoted to the frame to tilt vertically and laterally thereof, and the yoke connected to the frame and adjustable laterally and longitudinally upon the beam.

12. The combination with the main frame, the shares thereon and the supporting-wheels, of the beam pivoted on the frame to tilt laterally and vertically relative thereto, the bracket movable on the beam and the yoke connected to the frame and engaged by and moved with the bracket when the latter is operated in one direction and moving upon the bracket when moved in the other direction.

13. The combination with the main frame, the shares thereon, and the supporting-wheels, of the beam pivotally connected to the frame to turn laterally and tilt vertically relative thereto, the yoke connected to the frame, the bracket movable on the beam through which the yoke passes, and the adjustable connection between the bracket and yoke for adjusting the parts relatively.

14. The combination with the main frame, the standards adjustably secured thereto having the shares at their lower ends, of the beam pivotally connected to the frame to tilt vertically, the adjustable yoke connected to the standards at the ends and adjustable connections between the yoke and beam.

15. The combination with the main frame, the standards thereon, the brackets vertically adjustable on the standards and the supporting-wheels thereon, of the dividers pivoted on the brackets and the supporting-wheels for the dividers.

16. The combination with the main frame, the standards thereon and the shares on the latter, of the brackets vertically adjustable on the standards, the supporting-wheels thereon, the dividers pivotally connected to the brackets and the supporting-wheels for the dividers.

17. The combination with the main frame, the standards, the shares thereon, of the brackets adjustable on the standards, the supporting-wheels thereon, the dividers pivoted to the brackets and having the supporting-wheels and the gathering-rods extending rearwardly over the shares.

18. The combination with the main frame, the shares thereon and the supporting-wheels, of the beam pivotally connected to the frame to tilt vertically and turn horizontally relatively thereto, a yoke connected to the standards at the rear ends, the bracket movable on the beam and engaging the forward portion of the yoke, the adjusting-lever between the beam and bracket and the adjusting-lever between the bracket and yoke.

19. The combination with the main frame, the standards adjustable thereon, and the supporting-wheels, of the beam pivotally connected to the main frame to tilt vertically relatively thereto and the yoke connected to the standards embodying the three bars lapping, means for securing said bars together the central portion of said yoke being adjustably secured to the beam.

20. The combination with the main frame, the standards, the shares and the supporting-wheels, of the beam connected to the frame, the yoke connected to the lower ends of the standards and to the beam, the pivoted dividers having the supporting-wheels and guides between the dividers and the sides of the yoke.

21. The combination with the main frame, the supporting-wheels, the standards, and the beam connected to the main frame, of the yoke having its rear arms attached to the lower portions of the standards and its upper forward portion connected to the beam.

22. The combination with the main frame, the standards, and the supporting-wheels, of the yoke connected to the lower portions of the standards, the beam pivotally connected to the frame, the bracket sliding on the beam having the lugs embracing the yoke and means for adjusting and securing the bracket.

23. The combination with the beam, the bracket sliding thereon having the lugs, the removable confining-plate and the bolt for fastening the latter, of the yoke passing between the lugs and the main frame to which the yoke is connected.

24. The combination with the divided beam, the flanged bracket sliding thereon having the depending lugs, the confining-plate and the lever pivoted on the beam and connected to the bracket, of the yoke extending between the lugs, and the main frame to which the yoke is connected.

25. The combination with the main frame the standards and the beam pivoted on the frame and permitted a lateral and vertical relative adjustment, the yoke connected to the standards, the bracket on the beam having the lugs between which the yoke extends and means for adjusting and securing the yoke, of the lever connected to the bracket and yoke for adjusting the parts relatively and means for locking the parts.

26. The combination with the main frame, the standards, the beam, the inclined yoke, engaging the standards and beam, of the shoes having supporting-wheels and pivoted on the standards and guides between the shoes and yoke.

27. The combination with the main frame, the supporting-wheels therefor and the standards, of the shoes pivoted on the standards, having the supporting-wheels within them and extending laterally in front of the main-frame-supporting wheels.

28. The combination with the main frame, of the standard having the vertical, horizontal and inclined portions, clips for securing the horizontal parts of the standards to the frame, and the shares having the vertical extension secured between the lower ends of the standards.

29. The combination with the main frame, the standards, and the beam pivoted to the frame to swing relatively laterally thereof, of the segmental guide connected to the frame and means for detachably securing it intermediate of its ends to the beam.

30. The combination with the main frame, the standards, and the beam pivoted to the frame to swing relatively laterally thereof, of the yoke connected to the lower portions of the standards and having the curved forward portion engaging the beam and securing devices between the beam and yoke.

31. The combination with the main frame, the standards, and the beam pivoted to the frame to swing relatively, laterally and vertically thereof, of the yoke connected to the lower portion of the standards and adjustable laterally and longitudinally of the beam.

32. The combination with the main frame, the standards, and the beam pivoted to the frame to swing relatively laterally thereof, of the yoke embodying the two side bars and the central bar adjustably connected at their ends and securing devices for adjustably connecting the yoke and beam.

33. The combination with the main frame, the standards, and the beam pivoted upon the frame, of the yoke embodying the side bars connected to the standards, having the laterally-extending ends and the segmental connecting-bar lapping the ends of the side bars and adjustably connected thereto and detachable connections between the segmental bar and the beam.

34. The combination with the main frame, the beam pivotally connected to the frame to swing in vertical and horizontal planes of the standards on the frame, the brackets adjustable on the standards and the wheels thereon, the shares on the standards, the yoke connected to the lower portions of the standards and having an adjustable connection with the beam forward of its pivot, and the dividers pivoted on the brackets carrying the supporting-wheels and guided on the yoke.

35. The combination with the main frame, the standards removably connected thereto and the wheels secured on the standards, of the beam pivotally connected to the frame to swing relatively thereto in a horizontal plane, and an adjustable yoke connected at its ends to the lower portions of the standards and having its central portion adjustably connected to the beam.

FREDRICK W. MILLER.

Witnesses:
GEO. MCKAY,
C. C. HORTON.